J. E. SCHNEIDER.
FLUME GATE.
APPLICATION FILED NOV. 12, 1912.

1,062,364.

Patented May 20, 1913.

2 SHEETS—SHEET 1.

Witnesses
Robert M. Sutphen.
A. S. Hind.

Inventor
J. E. Schneider

By Watson E. Coleman
Attorney

J. E. SCHNEIDER.
FLUME GATE.
APPLICATION FILED NOV. 12, 1912.
1,062,364.
Patented May 20, 1913.
2 SHEETS—SHEET 2.
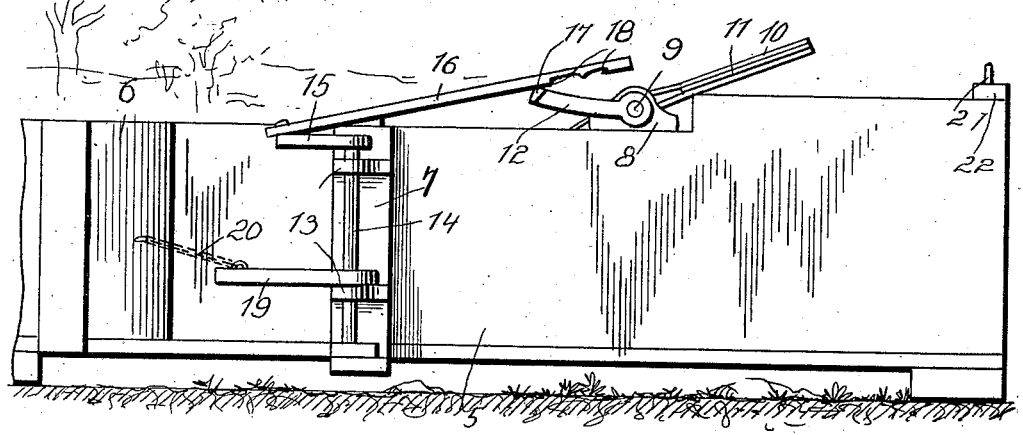
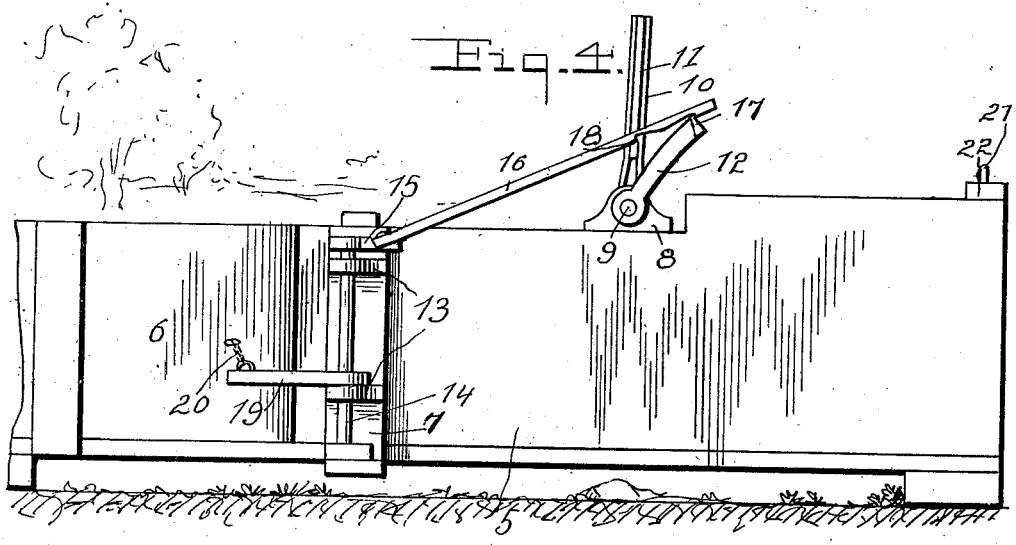
Witnesses
Robert M. Sutphen
A. I. Hind
Inventor
J. E. Schneider
By Watson E. Coleman
Attorney

UNITED STATES PATENT OFFICE.

JOHN E. SCHNEIDER, OF CORTEZ, COLORADO.

FLUME-GATE.

1,062,364.  Specification of Letters Patent.  Patented May 20, 1913.

Application filed November 12, 1912. Serial No. 731,003.

*To all whom it may concern:*

Be it known that I, JOHN E. SCHNEIDER, a citizen of the United States, residing at Cortez, in the county of Montezuma and State of Colorado, have invented certain new and useful Improvements in Flume-Gates, of which the following is a specification, reference being had to the accompanying drawings.

This invention relates to flume gates and has for its primary object to provide an automatic gate for flumes, ditches and the like which is opened and closed by water pressure.

Another and more specific object of the invention resides in the provision of a swinging flume gate mounted in one of the walls of the flume to extend transversely thereacross and entirely cut off the flow of water to the ditch, and means connected to said gate and actuated by the increase of pressure of the water in the flume to a predetermined point to swing the gate to its open and closed positions.

A still further object of the invention is to produce an automatic flume gate which is comparatively simple in its construction, durable and efficient in practical operation and may be produced at very small cost.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1:
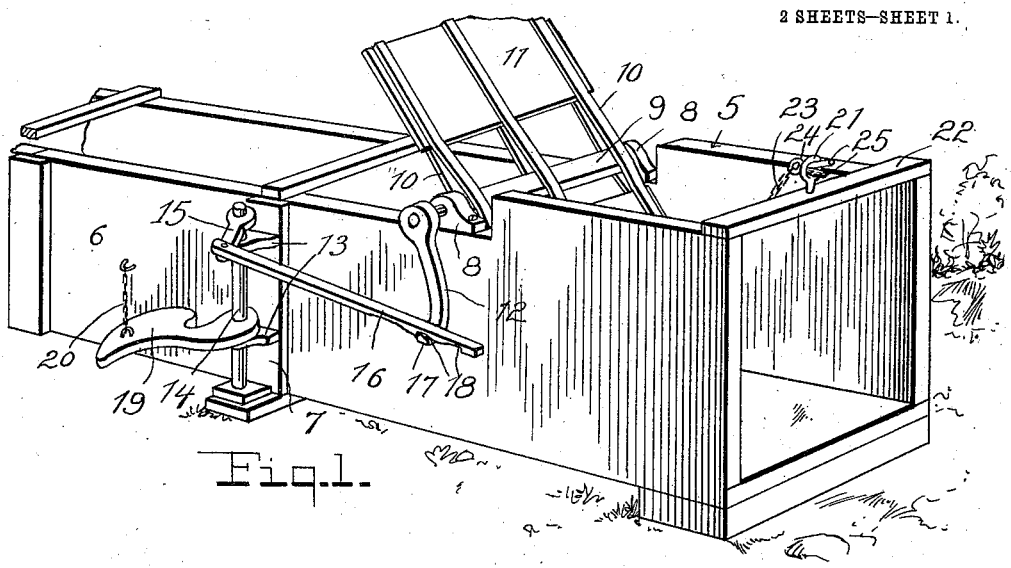
Figure 2:
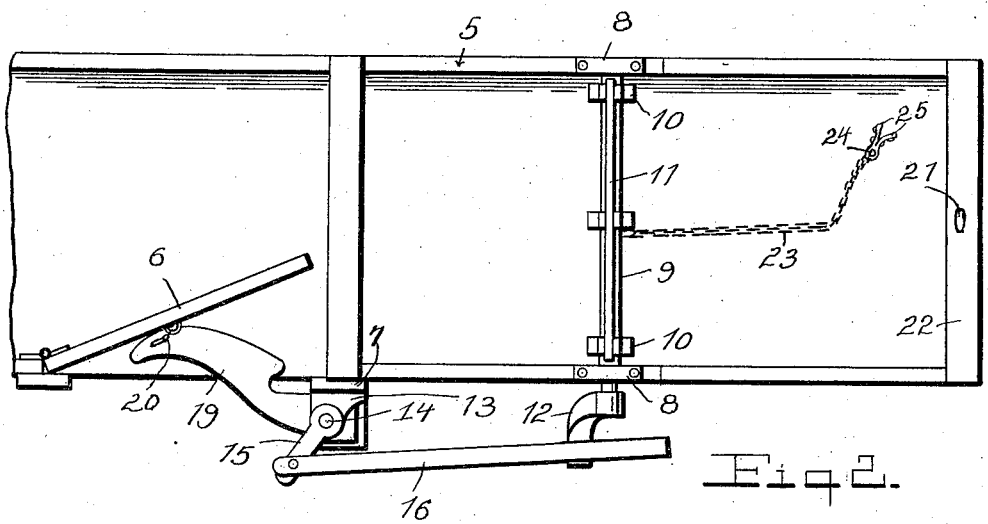
Figure 3:
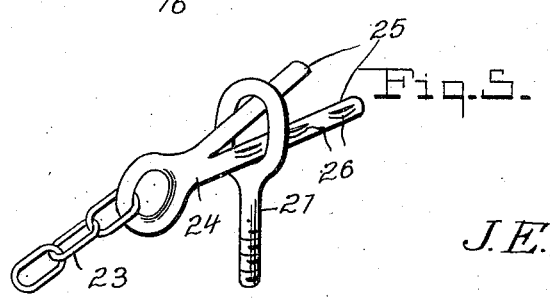

Figure 1 is a perspective view of an automatic flume gate constructed in accordance with the present invention, the gate being closed; Fig. 2 is a top plan view showing the gate in a partly opened position; Fig. 3 is a side elevation, the gate having moved to its fully opened position; Fig. 4 is a similar view showing the relative positions of the parts in the closing movement of the gate; and Fig. 5 is a detail perspective view illustrating the pressure regulating means for the actuating shaft.

Referring in detail to the drawings, 5 designates a flume which is employed for irrigation or other purposes, the same consisting of the usual side walls connected at their lower edges by the bottom wall. In one of the side walls of the flume, the transversely swinging gate 6 is hingedly mounted. To the flume wall, a vertical plate 7 is secured, said plate at one of its edges constituting an abutment or stop for the free end of the gate 6 to limit its outward swinging movement to its closed position.

The side walls of the flume 5 at its entrance end are of increased height and upon the same suitable bearings indicated at 8 are mounted to receive the ends of a shaft 9. To this shaft and extending upon opposite sides thereof the arms 10 are fixed. The pressure sustaining blades 11 are secured to the arms 10 and through the medium of the same, the shaft 9 is adapted to be rotated when the pressure of water in the head or entrance of the flume 5 increases beyond a predetermined point. To one end of the shaft 9 which projects beyond the side walls of the flume, a crank arm 12 is fixed, said arm being disposed in a different radial plane from the shaft 9 with respect to the blades 11.

Upon the plate 7, which is secured to the flume 5, the spaced bearings 13 are arranged and in the same the perpendicular rock shaft 14 is mounted. To the upper end of this shaft an arm 15 is secured. The outer end of this arm is connected by means of the bar 16 to the crank arm 12, said crank being provided upon its end with the lug 17 upon which the end of the bar 16 is engaged. The under side of the bar 16 is provided with spaced notches 18 in which the lug 17 is adapted to engage in the manner and for the purpose which will be hereinafter specifically referred to.

To the rock shaft 14 one end of a longitudinally curved presser arm 19 is fixed. The convex edge of this arm is opposed to the swinging gate 6 and is adapted to bear against the free end thereof when the shaft 14 is rocked to move said gate to a partly opened position, from which position its movement is continued by the pressure of the water thereagainst to a fully opened position wherein the free end of the gate will engage with the opposed wall of the flume, thereby checking the flow of the water and diverting the same through the gate opening and thus discharging the same from the flume. This arm is connected at its outer end by means of the chain 20 to the gate 6 and also returns the gate to its closed position when the rocking movement of the shaft 14 is reversed in the manner to be later described.

In order to regulate the pressure of the water which is necessary to move the blades 11 and thereby rotate the shaft 9, I provide an eye 21 which is secured in any suitable manner to a cross bar 22 connecting the side walls of the flume. One end of a chain 23 is attached to the outer edge of one of the blades 11 and to the other end of this chain a longitudinally split pin 24 is connected. The split portions 25 of this pin which extend in divergent relation are adapted to be inserted through the eye 21 and upon the convex surfaces of these split portions of the pin, the protuberances 26 are formed. The resiliency of the metal normally holds the split portions of the pin in spaced relation and causes the same to frictionally engage the inner side of the eye 21 at opposite points. The pull upon the pin 24 necessary to spring the split portions thereof inwardly so that they may be passed through the eye 21 will, of course, be greatest when the inner ends of said split portions are engaged with the eye, and a comparatively slight pull would effect the release of the pin 24 when the split portions thereof are engaged with the eye at their outer ends. The protuberances 26 upon the split portions 25 of the pin prevent accidental or unintentional disengagement of said pin from the eye and hold said pin in position until the water has risen in the flume to exert the necessary pressure upon the gate blade whereby the release of the pin is effected. It is of course understood that when the water in the flume lowers to its normal depth, the retaining device above described is reset to hold the rotary gate against movement and retain the swinging gate in its closed position.

In the operation of the device, assuming that the gate 6 is closed and the blades 11 are in the position shown in Fig. 1, upon the increase of water pressure beyond a predetermined point, the same will act against the lower blade 11 to rotate the shaft 9, and through the medium of the crank arm 12 and the connecting bar 16 and arm 15, oscillate the rock shaft 14. In this movement of the shaft 14, the arm 19 presses against the gate 6 and forces the same inwardly to the position shown in Fig. 2, the blades 11 being now disposed above and below the shaft 9, respectively. After reaching this position, the pressure of the water acting against the partly opened gate 6 continues the movement of said gate until the same is fully opened and disposed transversely across the flume as shown in Fig. 3. In this position of the parts, it will be observed that the crank 12 on the end of the shaft 9 has moved to a point slightly above a horizontal plane and the pressure of the water against the lowermost blade 11 continues the rotation of the shaft so as to swing the arm 12 upwardly and move the lug 17 thereof out of engagement with the innermost notch 18 and into the end notch provided in the under side of the bar 16. The blade 11 which is disposed above the shaft 9 at the start of the movement of the opening of the gate is now disposed below said shaft and in the water in the head of the flume. The water pressure acting against this blade continues the rotation of the shaft 9, and the arm 12 reverses the movement of the connecting bar 16 and thereby also reverses the oscillation of the shaft 14, and thus returns the gate 6 to its closed position. This operation continues, the gate being alternately opened and closed as long as there is sufficient pressure of water to act against the blades 11 and rotate the shaft 9. In Fig. 4, I have illustrated this last referred to position of the arm 12 with relation to the bar 16, in which position of the parts, the gate has not yet moved to its fully closed position, it will be noted that the bar 16 extends upwardly from the arm 15 to the arm 12 and there is sufficient pull upon the bar 16 in the continued rotation of the shaft 9 to tightly close the gate. When the arm 12 again moves downwardly below a horizontal plane, there is practically no longitudinal movement of the bar 16, the lug 17 on the end of the arm 12 sliding upon the bar 16 so that the lug will be again engaged in the forward notch 18 in the under side of said connecting bar. In this manner, it will be seen that when the flume is flooded by the heavy rains or other causes, the excess water therein will be diverted from its course so as to prevent flooding of the adjacent territory. The opening and closing movements of the gate are entirely automatic, and after all the parts have once been properly adjusted, the device requires no further attention, as the power for the operation of the device is furnished by the water itself, it will be apparent that after the installation of the invention, no further expense will be incurred in the operation thereof.

From the foregoing, it is thought that the construction and operation of my improved flume gate will be clearly understood.

It will be obvious that the device consists of but comparatively few parts which are of simple form, and that the same is highly durable and efficient in practical use.

While I have shown and described the preferred embodiment of the invention, it will be understood that the same is only illustrative and that the device is susceptible of considerable modification in the form, arrangement and proportion of the several elements as may suggest themselves in the adaptation of the invention for certain specific purposes without departing from the essential features or sacrificing any of the advantages involved therein.

Having thus described the invention, what is claimed is:

1. An automatic flume gate comprising the gate proper mounted in one of the side walls of the flume for transverse swinging movement, a rocker arm mounted upon the flume to move said gate, and operating means for said arm actuated by the increase of pressure beyond a predetermined point to automatically move the gate to its opened and closed positions.

2. An automatic flume gate comprising the gate proper mounted in one of the side walls of the flume for transverse swinging movement, a rock shaft, an arm fixed upon said rock shaft to bear against the free end of the gate, a flexible connection between said gate and the arm, and means mounted upon the flume and connected to the rock shaft and actuated by the increase of water pressure in the flume beyond a predetermined point to rock the shaft and alternately open and close the gate.

3. An automatic flume gate comprising the gate proper mounted in one of the side walls of the flume for transverse swinging movement, a rocker arm mounted upon the flume wall at the free end of the gate and adapted to bear against said gate and force the same inwardly, and operating means for said arm mounted upon the flume and actuated by the increase of water pressure in the flume beyond a predetermined point.

4. An automatic flume gate comprising the gate proper mounted in one of the side walls of the flume for transverse swinging movement, a perpendicular rock shaft mounted upon the flume, an arm fixed upon said shaft to bear against the gate and force the same inwardly, a flexible connection between said arm and the gate, a transverse shaft journaled upon the side walls of the flume, blades fixed to said shaft and extending into the flume, said shaft being rotated by the water pressure against said blades, and means connecting said shaft to the rock shaft to actuate the latter and alternately move the gate to its opened and closed positions.

5. An automatic flume gate comprising the gate proper mounted in one of the side walls of the flume for transverse swinging movement, a perpendicular rock shaft mounted upon the flume wall at the free end of the gate, a longitudinally curved arm fixed to said shaft to bear against the gate and force the same inwardly into the path of the water, a transverse shaft mounted upon the flume, blades fixed to said shaft and extending into the flume to receive the impact of the water and rotate said shaft, an arm fixed to one end of said shaft, an arm fixed to the rock shaft, a bar pivotally connected to one end of the latter arm, and coengaging means on the arm of said transverse shaft and said bar to reverse the movement of the rock shaft and alternately open and close said gate.

6. An automatic flume gate comprising the gate proper mounted in one of the flume walls for transverse swinging movement, means to bear against the free end of the gate and force the same inwardly into the path of the water, a flexible connection between said means and the gate, actuating means for said gate-moving means adapted to be actuated by the increase of pressure in the flume beyond a predetermined point, and means for varying the water pressure necessary to operate said gate-actuating means.

7. An automatic flume gate comprising the gate proper mounted in one of the flume walls for transverse swinging movement, means mounted upon the flume wall and bearing against said gate at its free end to force the same inwardly into the path of the water, said gate being moved to its fully opened position by the pressure of water thereagainst, a transverse shaft mounted upon the flume, blades carried by said shaft acted upon by the increase of water pressure in the flume, connecting means between said shaft and the gate-operating means, a stationary element, and means having adjustable engagement with said stationary element and connected to one of said blades whereby the water pressure necessary to rotate said shaft may be regulated.

In testimony whereof I hereunto affix my signature in the presence of two witnesses.

JOHN E. SCHNEIDER.

Witnesses:
H. W. BERGER,
C. H. RUDY.

Copies of this patent may be obtained for five cents each, by addressing the "Commissioner of Patents, Washington, D. C."